G. M. HUSTON.
VEHICLE SPRING.
APPLICATION FILED APR. 18, 1912.
1,032,335.
Patented July 9, 1912.
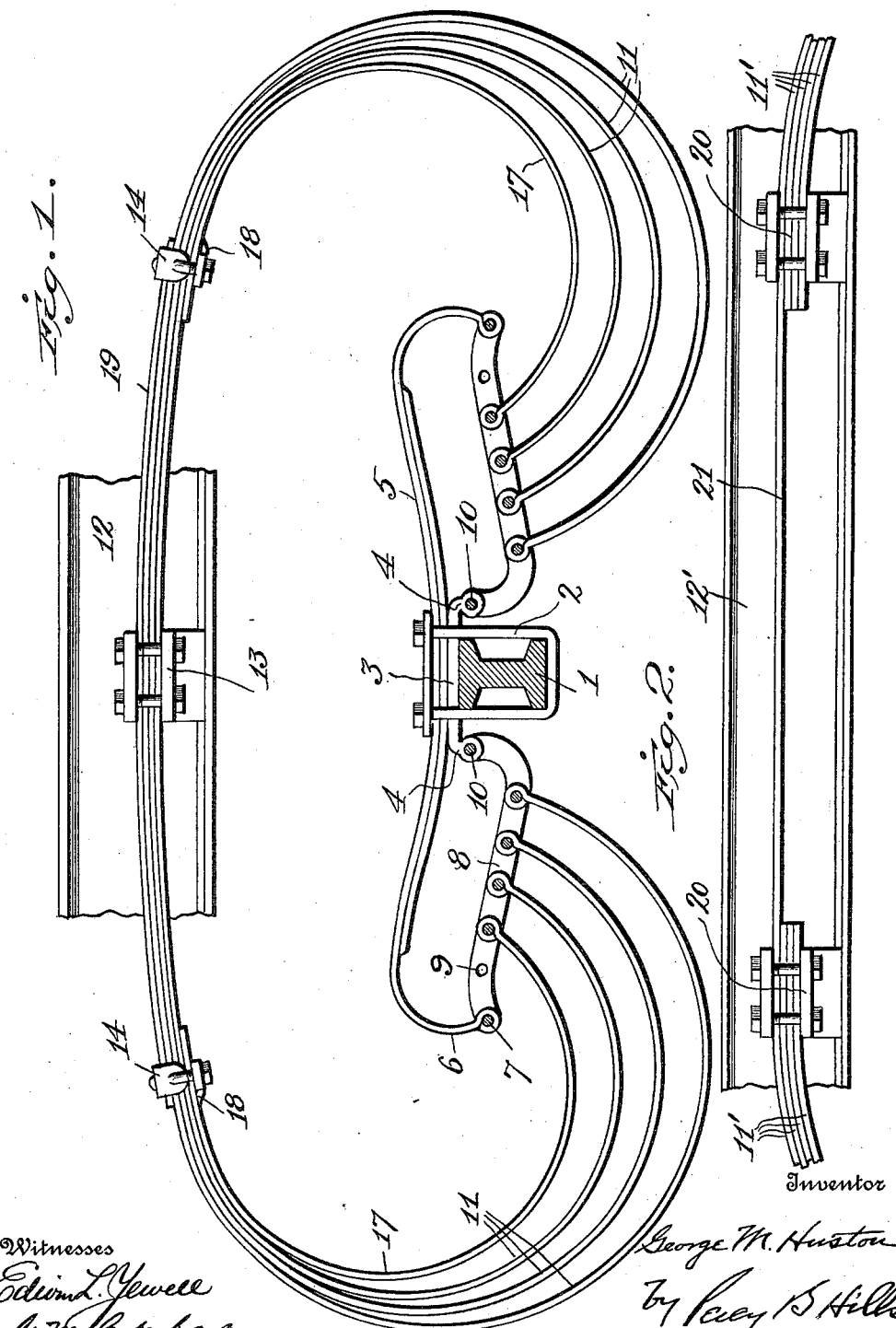

UNITED STATES PATENT OFFICE.

GEORGE M. HUSTON, OF NEW YORK, N. Y.

VEHICLE-SPRING.

1,032,335.   Specification of Letters Patent.   Patented July 9, 1912.

Application filed April 18, 1912. Serial No. 691,651.

*To all whom it may concern:*

Be it known that I, GEORGE M. HUSTON, a citizen of the United States, residing at New York, in the county of New York and State of New York, have invented certain new and useful Improvements in Vehicle-Springs; and I do hereby declare the following to be a full, clear, and exact description of the invention, such as will enable others skilled in the art to which it appertains to make and use the same.

My invention relates to vehicle springs, and has for its object certain improvements in the construction disclosed in an application for Letters Patent, filed by me April 3, 1912, Serial No. 688,326, as will be hereinafter more particularly described and claimed, reference being had to the accompanying drawing, in which:

Figure 1 is a side elevation of my improved construction shown applied to a vehicle axle and body, said axle being shown in section. Fig. 2 is a similar view in detail illustrating a slightly modified form of attachment of the spring to the vehicle.

In the said drawing the reference numeral 1 denotes one of the axles of an automobile or other vehicle, the same being shown I-shaped in cross section, though it may be of any configuration. Bolted to said axle at 2 is a plate 3, the same having formed integral therewith an arm 4 depending at each side of said axle, as shown. Bolted or otherwise fixed to said plate 3 is a leaf spring 5, formed of any desired number of leaves, and projecting equidistant transversely to each side of the axle 1, said spring being curved downwardly and inwardly at its outer ends 6, for a purpose hereinafter to be described. Pivotally connected at 7 to each free end of said spring 5 is a rigid bar or shackle 8 preferably slightly curved upwardly at its inner end and provided along its length with a plurality of bolt receiving apertures 9, said bar being shown pivotally connected at its inner end at 10 with the lower end of one of the arms 4 of plate 3. Pivotally connected to said shackle 8, through the bolt holes or apertures 9 are the ends of a series of spring leaves 11, the same sweeping therefrom upwardly in the arcs of circles and being conjointly connected to the body 12 of the vehicle at a point 13 directly above the axle 1, said leaves extending in similar configuration downwardly again to the shackle 8 on the opposite side of axle 1. I prefer to graduate the thickness of said leaves 11, the outermost being thickest and the innermost the thinnest. Also attached to the shackle 8 on each side through one of the bolt holes 9 is a supplemental spring leaf 17 curved similarly to leaves 11 and being of a length to reach and pass through the clips 14, the same being each formed with a shoulder 18 adapted to engage the clip 14 to limit longitudinal movement of said leaf therethrough.

The operation is the same as that described in my application hereinbefore referred to. That is to say, any shock imparted to the axle 1 from the wheels of the vehicle will cause a relative movement of the outer ends of leaf spring 5 downwardly with respect to said axle, and a corresponding downward movement of the outer ends of shackles 8 on their pivots 10, the curved configuration at 6 of said leaf springs freely permitting this movement. In consequence the lower ends of leaves 11 are carried downward in varying degrees according to the distances of their points of attachment to shackles 8 from the pivots 10, the lighter inner leaf being carried farther than the outer heavier leaves. This results in a progressively increased area of contact between the faces of said leaves from their common point of connection 13 with the vehicle body toward their separated points of connection with the shackles 8, which will vary in accordance with the shock imparted to axle 1, and as said area of contact increases, the rigidity of said leaves increases correspondingly to afford a progressive increase in the resistance offered to the shock, until the latter is completely absorbed.

It will be seen from the drawing that beginning at substantially the points where the clips 14 are located the leaves 11 are formed on the arcs of true circles of varying diameters, which construction permits of their accurately registering in progressive contact with each other while absorbing shocks imparted to the axle 1.

The addition of the leaf 17 on each side, which can be readily inserted after the device is positioned on the vehicle provides for carrying additional loads, as when an automobile is to be used for touring and much additional weight is to be carried.

In order to afford additional stiffness to the spring leaves 11 between the clips 14 and their point of connection 13 with the vehicle body, I provide an additional spring leaf 19 the same terminating at the clips 14, as shown.

In Fig. 2 I have shown a slightly modified construction, in which the ends of the spring leaves 11' are clipped to the vehicle body 12' at two points 20, the uppermost leaf alone being extended between the two sets of leaves at 21. This connection of the two sets of leaves is solely for the purpose of transportation, and said part 21 may be cut away after the leaves are fastened at 20.

It will be understood that while I have shown the leaves 11 extended to opposite sides of the axle 1, my improved construction is equally as effective and will operate in the same manner when said leaves are disposed on one side only of said axle and terminate at the point 13 on the vehicle body, the shackle 8 and that portion of leaf spring 5 upon the opposite side of axle 1 being of course also dispensed with.

Having thus described my invention, what I claim as new and desire to secure by Letters Patent is:

1. A spring construction for vehicles, embodying a plurality of similarly curved spring leaves fixed to one member in contact with each other and gradually separating toward their points of connection with the other member, a supplemental similarly curved leaf detachably attached to said other leaves at a point intermediate their length, and a common means for variably shifting the separated ends of all of said leaves under relative movement of the parts.

2. A spring construction for vehicles, embodying a plurality of similarly curved spring leaves fixed to one member in contact with each other and gradually separating toward their points of connection with the other member, a supplemental similarly curved leaf detachably attached to said other leaves at a point intermediate their length, and a shackle to which said separated ends of all of said leaves are connected which moves under relative movement of the members to impart a progressively increasing shift to said ends of said leaves from the outermost to the innermost of said leaves.

3. A spring construction for vehicles, embodying oppositely disposed sets of similarly curved spring leaves each set being separately fixed to one member in contact with each other and gradually separating toward their points of connection with the other member, one of said leaves being extended to form a leaf common to and uniting the two sets of leaves.

In testimony whereof I affix my signature, in presence of two subscribing witnesses.

GEORGE M. HUSTON.

Witnesses:
PERCY B. HILLS,
CHARLES LOWELL HOWARD.

---

Copies of this patent may be obtained for five cents each, by addressing the "Commissioner of Patents, Washington, D. C."